(12) United States Patent
Kim et al.

(10) Patent No.: US 9,026,418 B2
(45) Date of Patent: May 5, 2015

(54) METHOD FOR DETERMINING DISTINCT ALTERNATIVE PATHS BETWEEN TWO OBJECT SETS IN 2-D AND 3-D HETEROGENEOUS DATA

(75) Inventors: Chul-Sung Kim, Houston, TX (US); Mark Dobin, The Woodlands, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 1298 days.

(21) Appl. No.: 12/747,778

(22) PCT Filed: Jan. 21, 2009

(86) PCT No.: PCT/US2009/031578
§ 371 (c)(1),
(2), (4) Date: Jun. 11, 2010

(87) PCT Pub. No.: WO2009/114211
PCT Pub. Date: Sep. 17, 2009

(65) Prior Publication Data
US 2010/0270027 A1    Oct. 28, 2010

Related U.S. Application Data

(60) Provisional application No. 61/068,951, filed on Mar. 10, 2008.

(51) Int. Cl.
*G06G 7/50* (2006.01)
*G06G 7/48* (2006.01)
*G01V 99/00* (2009.01)

(52) U.S. Cl.
CPC ............ *G01V 99/00* (2013.01); *G01V 99/005* (2013.01)

(58) Field of Classification Search
CPC ........................... G01V 2210/66; E21B 43/00
USPC ....................................................... 703/9, 10
See application file for complete search history.

(56) References Cited

U.S. PATENT DOCUMENTS

| | | | |
|---|---|---|---|
| 4,809,240 A | 2/1989 | Mufti |
| 4,972,383 A | 11/1990 | Lailly |
| 5,018,112 A | 5/1991 | Pinkerton et al. |
| 5,040,414 A | 8/1991 | Graebner |
| 5,159,833 A | 11/1992 | Graebner et al. |
| 5,586,082 A | 12/1996 | Anderson et al. |

(Continued)

FOREIGN PATENT DOCUMENTS

| | | |
|---|---|---|
| GB | 2145508 | 3/1985 |
| WO | WO 2006/127151 | 11/2006 |

(Continued)

OTHER PUBLICATIONS

Ainsworth, R.B., (2005) "Sequence Stratigraphic-Based Analysis of Depositional Architecture—A Case Study From a Marginal Marine Depositional Setting," *Petro. Geoscience*, v. 11, pp. 257-276.

(Continued)

*Primary Examiner* — David Silver
(74) *Attorney, Agent, or Firm* — ExxonMobil Upstream Research Company Law Dept.

(57) ABSTRACT

Distinct paths (40), e.g., locally optimal, are determined in a heterogeneous velocity field (32) between a source object and a target object (33) using gradients (35) of a two-way total arrival time field (34). The foregoing technique may be used to assess hydrocarbon reservoir connectivity.

11 Claims, 6 Drawing Sheets

(56) References Cited

U.S. PATENT DOCUMENTS

| | | | |
|---|---|---|---|
| 5,757,663 A | 5/1998 | Lo et al. |
| 5,798,982 A | 8/1998 | He et al. |
| 5,835,882 A | 11/1998 | Vienot et al. |
| 6,012,018 A | 1/2000 | Hornbuckle |
| 6,052,650 A | 4/2000 | Assa et al. |
| 6,128,577 A | 10/2000 | Assa et al. |
| 6,246,963 B1 | 6/2001 | Cross et al. |
| 6,393,906 B1 | 5/2002 | Vityk et al. |
| 6,401,042 B1 | 6/2002 | Van Riel et al. |
| 6,514,915 B1 | 2/2003 | Beyer et al. |
| 6,549,879 B1 * | 4/2003 | Cullick et al. | 703/10 |
| 6,618,678 B1 | 9/2003 | Van Riel |
| 6,661,000 B2 | 12/2003 | Smith et al. |
| 6,674,689 B2 | 1/2004 | Dunn et al. |
| 6,690,820 B2 | 2/2004 | Lees et al. |
| 6,754,588 B2 | 6/2004 | Cross et al. |
| 6,810,332 B2 | 10/2004 | Harrison |
| 6,823,266 B2 | 11/2004 | Czernuszenko et al. |
| 6,826,483 B1 | 11/2004 | Anderson et al. |
| 6,912,467 B2 | 6/2005 | Schuette |
| 6,950,751 B2 | 9/2005 | Knobloch |
| 6,985,841 B2 | 1/2006 | Barroux |
| 6,987,878 B2 | 1/2006 | Lees et al. |
| 7,013,218 B2 | 3/2006 | Baker et al. |
| 7,024,021 B2 | 4/2006 | Dunn et al. |
| 7,092,824 B2 | 8/2006 | Favret et al. |
| 7,113,869 B2 | 9/2006 | Xue |
| 7,114,566 B2 * | 10/2006 | Vinegar et al. | 166/256 |
| 7,124,030 B2 | 10/2006 | Ellis |
| 7,174,254 B2 | 2/2007 | Ellis |
| 7,210,342 B1 | 5/2007 | Sterner et al. |
| 7,249,009 B2 | 7/2007 | Ferworn et al. |
| 7,297,661 B2 | 11/2007 | Beyer et al. |
| 7,337,660 B2 | 3/2008 | Ibrahim et al. |
| 7,344,889 B2 | 3/2008 | Kelemen et al. |
| 7,387,021 B2 | 6/2008 | DiFoggio |
| 7,395,691 B2 | 7/2008 | Sterner et al. |
| 7,415,401 B2 | 8/2008 | Calvert et al. |
| 7,520,158 B2 | 4/2009 | DiFoggio |
| 7,526,418 B2 | 4/2009 | Pita et al. |
| 7,529,626 B1 | 5/2009 | Ellis |
| 7,565,243 B2 * | 7/2009 | Kim et al. | 702/2 |
| 7,743,006 B2 | 6/2010 | Woronow et al. |
| 8,365,831 B2 | 2/2013 | Kim et al. |
| 8,370,122 B2 | 2/2013 | Walker et al. |
| 8,437,997 B2 | 5/2013 | Meurer et al. |
| 2002/0013687 A1 | 1/2002 | Ortoleva |
| 2002/0049575 A1 | 4/2002 | Jalali et al. |
| 2002/0067373 A1 | 6/2002 | Roe et al. |
| 2002/0099504 A1 | 7/2002 | Cross et al. |
| 2002/0120429 A1 | 8/2002 | Ortoleva |
| 2003/0100451 A1 * | 5/2003 | Messier et al. | 507/100 |
| 2003/0183390 A1 * | 10/2003 | Veenstra et al. | 166/302 |
| 2003/0200030 A1 | 10/2003 | Meldahl |
| 2004/0020642 A1 * | 2/2004 | Vinegar et al. | 166/245 |
| 2004/0148147 A1 | 7/2004 | Martin |
| 2004/0210547 A1 | 10/2004 | Wentland et al. |
| 2004/0220790 A1 | 11/2004 | Cullick et al. |
| 2004/0254734 A1 | 12/2004 | Zabalza-Mezghani et al. |
| 2005/0096893 A1 | 5/2005 | Feraille et al. |
| 2005/0149307 A1 | 7/2005 | Gurpinar et al. |
| 2005/0171700 A1 | 8/2005 | Dean |
| 2005/0199391 A1 | 9/2005 | Cudmore et al. |
| 2005/0209866 A1 | 9/2005 | Veeningen et al. |
| 2005/0209912 A1 | 9/2005 | Veeningen et al. |
| 2005/0213809 A1 | 9/2005 | Lees et al. |
| 2005/0234690 A1 | 10/2005 | Mainguy et al. |
| 2005/0256647 A1 | 11/2005 | Ellis |
| 2006/0014647 A1 | 1/2006 | Beyer et al. |
| 2006/0041409 A1 | 2/2006 | Strebelle et al. |
| 2006/0047489 A1 | 3/2006 | Scheidt et al. |
| 2006/0052938 A1 | 3/2006 | Thorne et al. |
| 2006/0092766 A1 | 5/2006 | Shelley et al. |
| 2006/0235666 A1 | 10/2006 | Assa et al. |
| 2006/0235667 A1 | 10/2006 | Fung et al. |
| 2006/0235668 A1 | 10/2006 | Swanson et al. |
| 2006/0241867 A1 | 10/2006 | Kuchuk et al. |
| 2006/0265204 A1 | 11/2006 | Wallis et al. |
| 2006/0277012 A1 | 12/2006 | Ricard et al. |
| 2006/0277013 A1 | 12/2006 | Bennis et al. |
| 2006/0282243 A1 | 12/2006 | Childs et al. |
| 2006/0287201 A1 | 12/2006 | Georgi et al. |
| 2006/0293872 A1 | 12/2006 | Zamora et al. |
| 2007/0005253 A1 | 1/2007 | Fornel et al. |
| 2007/0011646 A1 | 1/2007 | Chrisochoides et al. |
| 2007/0013690 A1 | 1/2007 | Grimaud et al. |
| 2007/0016389 A1 | 1/2007 | Ozgen |
| 2007/0027666 A1 | 2/2007 | Frankel |
| 2007/0143024 A1 | 6/2007 | Michel et al. |
| 2007/0156377 A1 | 7/2007 | Gurpinar et al. |
| 2007/0219724 A1 * | 9/2007 | Li et al. | 702/12 |
| 2007/0219725 A1 | 9/2007 | Sun et al. |
| 2007/0242564 A1 | 10/2007 | Devi |
| 2007/0265778 A1 | 11/2007 | Suter et al. |
| 2008/0040086 A1 | 2/2008 | Betancourt et al. |
| 2008/0059140 A1 | 3/2008 | Salmon et al. |
| 2008/0097735 A1 | 4/2008 | Ibrahim et al. |
| 2008/0099241 A1 | 5/2008 | Ibrahim et al. |
| 2008/0147326 A1 | 6/2008 | Ellis |
| 2008/0173804 A1 | 7/2008 | Indo et al. |
| 2009/0071239 A1 | 3/2009 | Rojas et al. |
| 2011/0063292 A1 | 3/2011 | Holl et al. |
| 2012/0016648 A1 | 1/2012 | Myers et al. |
| 2013/0042677 A1 | 2/2013 | Snedden et al. |

FOREIGN PATENT DOCUMENTS

| | | | |
|---|---|---|---|
| WO | WO 2006127151 A1 * | 11/2006 | G01V 1/30 |
| WO | WO 2007/007210 | 1/2007 | |
| WO | WO 2007/063442 | 6/2007 | |
| WO | WO 2007/106244 | 9/2007 | |
| WO | WO 2008/100614 | 8/2008 | |
| WO | WO 2009/079123 | 6/2009 | |
| WO | WO 2009/094064 | 7/2009 | |
| WO | WO 2010/008647 | 1/2010 | |
| WO | 2014/051904 | 4/2014 | |

OTHER PUBLICATIONS

Allen, J.R.L., (1978), "Studies in Fluviatile Sedimentation; An Exploratory Quantitative Model for the Architecture of Avulsion-Controlled Alluvial Sites," *Sedimentary Geology*, v. 21(2), pp. 129-147.

Barton, M., et al., (2004), "Understanding Hydrocarbon Recovery in Deepwater Reservoirs; Modeling Outcrop Data in the Third Dimension," *AAPG*, v. 13, pp. 11.

Dijkstra, E.W. (1959), "A Note on Two Problem in Connection with Graphs", *Numerische Mathematic* 1, pp. 269-271.

Elshahawi, H., et al., (2000) "Correcting for Wettability and Capillary Pressure Effects on Formation Tester," SPE 63075.

Firoozabadi, A., et al. (1998), "Surface Tension of Water-Hydrocarbon Systems at Reservoir Conditions," *J. of Canadian Petro. Tech., Reservoir Engineering*, v. 41, 8 pgs.

Fowler, J. et al. (2000), "Simultaneous Inversion of the Ladybug prospect and derivation of a lithotype volume", 2000 SEG Expanded Abstracts, 3 pgs.

Gainski, M. et al., (2008) "The Schiehallion Field: Detection of Reservoir Compartmentalisation and Identification of New Infill Targets Using 4D Seismic Surveys and Dynamic Production Data, Reservoir Compartmentalization", [Online], pp. 32. Retrieved from the Internet: URL:http//www. geolsoc.org.uk/webdav/site/GSL/shared/pdfs/events/abstracts/Reservoir_AbstractBook.pdf.

James, W.R. et al. (2004), "Fault-Seal Analysis Using a Stochastic Multi-Fault Approach," *AAPG Bulletin*, v. 88(7), pp. 885-904.

Justwan, H., et al., "Characterization of Static and Dynamic Reservoir Connectivity for the Ringhorne Field, Through Integration of Geochemical and Engineering Data," Reservoir Compartmentalization, 1 pg.

Justwan, H.K., et al. (2008), "Unraveling Dynamic Fluid Connectivity Through Time-Lapse Geochemistry—From Example From the Ringhome Field, Norway," AAPG Int'l Conf and Exhibition, Cape Town, South Africa 2008.

(56) References Cited

OTHER PUBLICATIONS

King, P.R. (1990), "The Connectivity and Conductivity of Overlapping Sand Bodies," The Norwegian Institute of Technology (Graham & Trotman), pp. 353-362.
Laure, D.K., et al. (2006), "Connectivity of Channelized Reservoirs: A Modeling Approach," *Petro. Geoscience*, v. 12, pp. 291-308.
Lescoffit, G.,et al. (2005), "Quantifying the Impact of Fault Modeling Parameters on Production Forecasting for Clastic Reservoirs," *AAPG Hedberg Series*, No. 2, pp. 137-149.
McCain, W.D., Jr. (1991), "Reservoir-Fluid Property Correlations—State of the Art," *SPERE*, p. 266.
Manzocchi, T., et al. (2008), "Sensitivity of the Impact of Geological Uncertainty on Production From Faulted and Unfaulted Shallow-Marine Oil Reservoirs: Objectives and Methods," *Petro. Geoscience*, v. 14, pp. 3-15.
Richards, B., et al. (2008), "Reservoir Connectivity Analysis of a Complex Combination Trap Terra Nova Field, Jeanne d'Arc Basin, Newfoundland, Canada," Reservoir Compartmentalization, London Geological Society, p. 59.
Sales, J.K. (1997), "Seal Strength Vs. Trap Closure; A Fundamental Control on the Distribution of Oil and Gas, In: Seals, Traps, and the Petroleum System," *AAPG*, v. 67, pp. 57-83.
Schlumberger (2004), "Managing Uncertainty in Oilfield Reserves," *Middle East Well Evaluation Review*, v. 12, 11 pgs.
Sethian, J.A. (1996), "Level set methods and fast marching methods", Cambridge University Press, pp. 284-286.
Stright, L. (2005), "Modeling, Upscaling and History Matching Thin, Irregularly-Shaped Flow Barriers: A Comprehensive Approach for Predicting Reservoir Connectivity," 2005 SPE Annual Tech. Conf. & Exh., Oct. 24-27, 2005, 8 pgs.
Snedden, J.W., et al. (2007), "Reservoir Connectivity: Definitions, Examples and Strategies," IPTC 11375, Int'l. Petro. Tech. Conf., Dubai, UAE, Dec. 4-6, 2007, 6 pgs.
Sumpter, L., et al. (2008), "Early Recognition of Potential Reservoir Compartmentalization," Reservoir Compartmentalization, London Geological Society, Mar. 5-6, 2008, p. 84.
Sweet, M.L., et al. (2007), "Genesis Field, Gulf of Mexico: Recognizing Reservoir Compartments on Geologic and Production Timescales in Deep-Water Reservoirs," *AAPG*, v. 91, pp. 1701-1729.
Vrolijk, P.J., et al. (2005), "Reservoir Connectivity Analysis—Defining Reservoir Connections and Plumbing," SPE 93577, 23 pgs.
International Search report and Written Opinion, dated Mar. 13, 2009, PCT/US2009/031578.

\* cited by examiner

METHOD FOR DETERMINING DISTINCT ALTERNATIVE PATHS BETWEEN TWO OBJECT SETS IN 2-D AND 3-D HETEROGENEOUS DATA

CROSS-REFERENCE TO RELATED APPLICATION

This application is the National Stage of International Application No. PCT/US2009/031578 that published as WO 2009/114211 and was filed on 21 Jan. 2009, which claims the benefit of U.S. Provisional Application No. 61/068,951, filed 10 Mar. 2008, each of which is incorporated herein by reference, in its entirety, for all purposes.

TECHNICAL FIELD

This description relates generally to the field of geophysical prospecting, including reservoir delineation, and more particularly, to assessing connectivity between parts of a petroleum reservoir or between parts of different reservoirs (collectively referred to herein as "reservoir connectivity") by determining distinct alternative paths between two object sets in two-dimensional or three-dimensional data volumes representative of the reservoir or reservoirs. Typical geologic data volumes include seismic and seismic derived data volume, geologic model data volume, and reservoir simulation model data volume.

BACKGROUND

Understanding reservoir connectivity is beneficial to the management of an oil or gas asset from exploration to abandonment. Connectivity assessment can greatly affect decisions made in all phases of an asset's life cycle from optimally determining initial well locations to improving reservoir management decisions later in the field's life. Specifically, this description presents an efficient method of determining distinct, alternative paths between two object sets in a heterogeneous geologic data volume, which describe porous geobodies, such as sand deposits capable of being hydrocarbon reservoirs, scattered throughout a nonporous medium like shale.

SUMMARY

In one general aspect, e.g., as illustrated by the flow chart of FIG. 3, a method for assessing reservoir connectivity in a subsurface region for the purpose of planning and managing production of hydrocarbons from the subsurface region includes creating a geologic cellular model of at least a portion of the subsurface region. The model contains a value of a selected geophysical property for each cell of the model, e.g., step 31 in FIG. 3. A front propagation speed is determined as a function of the selected geophysical property, e.g., step 32. A source object and a target object are selected in the model, e.g., step 33 in FIG. 3. Arrival time is calculated for a front beginning at the source object to reach the cell, for a plurality of cells in the model excluding source and target cells. The arrival time for a front beginning at the target object to reach the cell is then calculated, and the two calculated times are then added together. A two-way total arrival time database or field is created, the arrival time being calculated using the front propagation speed function, e.g., step 34 in FIG. 3. One or more distinct paths connecting source and target objects are determined by calculating and using gradients and/or curvatures of two-way total arrival times at a plurality of model cells, e.g., steps 35-42 in FIG. 3. Reservoir connectivity between source and target is assessed using the one or more distinct paths. The production of hydrocarbons from the subsurface region is planned or managed using the reservoir connectivity assessment.

Implementations of this aspect may include one or more of the following features. For example, determining one or more distinct paths connecting source and target objects by calculating and using gradients and/or curvatures of two-way total arrival times at a plurality of model cells includes one or more of (i) forming, using, and updating a current candidate cell list consisting of cells that have gradient (step 35) magnitude value of zero to within a selected tolerance (step 36); (ii) selecting a cell from the current candidate cell list (step 37) and determining an optimal path from the selected cell to the source object and another optimal path from the selected cell to the target object, and combining them to form an optimal path associated with the selected cell (step 38); (iii) accepting the optimal path associated with the selected cell as a distinct path (step 40) if it passes through or touches at least a predetermined number of cells having zero gradient within a selected tolerance (step 39), such cells being located within a predetermined proximity to the selected cell; and/or (iv) identifying candidate cells within a pre-selected distance S from each distinct path, and updating the list of candidate cells by discarding such cells from the list (step 40). Steps (ii)-(iv) are repeated until all cells in the updated list of candidate cells have been selected (step 41).

Implementations of this aspect may include one or more of the following features. For example, the selected cell may have a two-way total arrival time as low or lower than any other candidate cell. An optimal path may be determined from the selected cell to the source object and another optimal path from the selected cell to the target object by backtracking the gradient of the two-way total arrival time field from the source and target respectively. The selected source and target objects may represent a production well and an injection well. The selected tolerance for zero gradient may be ±2% of a maximum gradient value. The selected geophysical property may be porosity or permeability. The geologic cellular model may be a two-dimensional model or a three-dimensional model.

In another general aspect, a method for producing hydrocarbons from a subsurface region includes obtaining a hydrocarbon development plan for the subsurface region. The hydrocarbon development plan for the subsurface region is formulated by: (i) creating a geologic cellular model of at least a portion of the subsurface region, said model containing a value of a selected geophysical property for each cell of the model; (ii) determining a front propagation speed as a function of the selected geophysical property; (iii) selecting a source object and a target object in the model; (iv) excluding source and target cells for a plurality of cells in the model, calculating arrival time for a front beginning at the source object to reach the cell, then calculating the arrival time for a front beginning at the target object to reach the cell, then adding the two calculated times together and creating a two-way total arrival time database or field, said arrival time being calculated using the front propagation speed function; (v) determining one or more distinct paths connecting source and target objects by calculating and using gradients and/or curvatures of two-way total arrival times at a plurality of model cells; (vi) assessing reservoir connectivity between source and target using the one or more distinct paths; and (vii) generating a hydrocarbon development plan for the subsurface region based at least partly on the reservoir connectivity assessment. The development plan is used to produce hydrocarbons from the subsurface region.

BRIEF DESCRIPTION OF THE DRAWINGS

The present invention and its advantages will be better understood by referring to the following detailed description and the attached drawings in which.

Figure 1A:
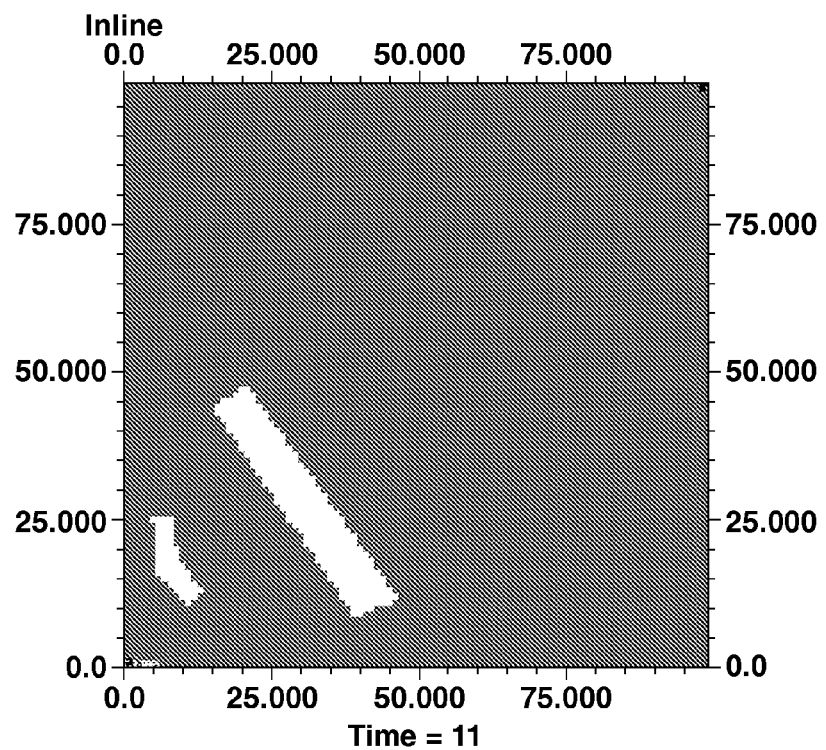
FIG. 1A shows an example two dimensional heterogeneous media with two barriers between a pair of source and target.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF PREFERRED EMBODIMENTS

An object set is composed of finite number of objects. One or more of the following embodiments involves connected paths between two object sets, e.g., these two object sets are referred to hereinafter as source object set and target object set, or just simply source and target. Also, object sets may be referred to hereinafter simply as objects. Objects may include, but are not limited to, injection wells, production wells, and gas and water contacts or any other data points in hydrocarbon reservoirs.

In this description, distinct alternative paths are further specified as locally optimal paths between two objects. A path is locally optimal if any neighboring path that deviates from this path would have a larger distance. Here, the distance of a path is measured by the travel time of a path. When speed at each location or at each cell of a three dimensional grid data volume is the same, or when a distance is measured by a Euclidean distance metric, there is only one locally optimal path (of shortest distance) between two objects. However, when speeds are a function of locations, there can be more than one locally optimal path.

The problem of determining an optimal path between a source and target pair in a heterogeneous medium, where speed of propagation is a function of a location, can be solved by many different approaches. For example, one efficient method is that of using a fast marching method suggested by J. A. Sethian in *Level set methods and fast marching methods*, Cambridge University Press, 284-286 (1996).

A more difficult problem is that of determining all locally optimal paths between source and target in a heterogeneous media. The present inventors (PCT Patent Application Publication No. WO 2006/127151) describe a method for determining N best paths and their quality between source and target. However, these N best paths are not guaranteed to be locally optimal in their path distance.

In a previous patent application 61/008,048, the present inventors described a method for determining distinct paths among multiple (two or more) objects sets. In contrast, this description relates to alternative techniques for determining "distinct" paths between two object sets.

For example, PCT Patent Application Publication No. WO 2006/127151 describes methods of analyzing reservoir connectivity by computing distance field from an object with a fast marching method. This publication also describes a method of determining N best paths by computing distance field from two objects. In that previous publication, the distance from two objects is defined as the sum of distances from two objects. These two techniques from WO 2006/127151 are described briefly hereinafter. Then, a new method is described for determining distinct alternative paths between two objects by using distance field from two objects.

Distance Field Computation with Fast Marching Method

The present inventive techniques take an approach of measuring the connected quality or the distance between two objects in a geologic model as the time needed to propagate a front from one object to the other. It is assumed that the speed of propagation of a front can be described as a function of attribute values of the cells in a geologic data volume. In some embodiments, a numerical method is employed that computes a propagating interface from an initial interface expanding outward, where the speed or the transmissibility is always positive.

The equation describing the front propagation is:

$$|\nabla T|F = 1 \qquad (1)$$

$$a.\ T(x, y) = 0 \text{ on } \Gamma(t=0), \qquad (1a)$$

where $\Gamma(t=0)$ is the initial location of the interface at time $t=0$, b. Front=$\Gamma(t)=\{(x,y)|T(x,y)=t\}$, c. $T(x,y)$ is the time of arrival at a cell located at $(x,y)$, and d. $F(x,y)$ is the speed of the propagation at a cell $(x,y)$.

A numerical method is employed to compute front arrival time $T(x, y)$ at all cell locations given the initial condition specified in equation (1a) and the speed $F(x, y)$ at all $(x, y)$ locations. The initial condition (1a) applies to the cells at source or seed locations, i.e. any cell in the data volume selected by the user to be a starting point for front propagation. In this method, the speed F depends only on position and it becomes the "Eikonal" equation. A fast numerical method known as a fast-marching method may be used to solve equation (1) above in a three-dimensional space. However, the invention is not limited to the fast marching method. Any method that solves the "Eikonal" equation or computes a distance field, such as for example a less accurate method known as Dijktra's method ("A Note on Two Problems in Connection with Graphs," *Numerische Mathematic* 1, 269-271 (1959)), may be employed.

Distance field from two objects and determination of the $n^{th}$ best path.

In this description, distance between a point (or a cell in a two dimensional or three dimensional grid data volume) and two objects is defined as the sum of the distance between a point and the first object and the distance between a point and the second object. Here, the distance from a cell to the first object is obtained by using a fast marching method starting from the first object and the distance from a cell to the second object is obtained by using a fast marching method that starts from the second object. In an actual implementation, distance or arrival time from a selected source object indexed by "s", $T_s(x_i,y_j)$, is computed for all the cells in data volume. Then, distance or arrival time from a selected target object indexed by "t", $T_t(x_i,y_j)$, is computed for all the cells in data volume. Then, a combined distance field, $T_{total}(x_i,y_j)=T_s(x_i,y_j)+T_t(x_i,y_j)$, represents the distance to two objects "s" and "t" from a cell at $(x_i, y_j)$. The quantity $T_{total}(x_i,y_j)$ may be called a two-way total distance of a cell at $(x_i,y_j)$ from two objects "s" and "t". $T_{total}(T_s(x_i,y_j)$ represents total time needed to travel from source "s" to target "t" by way of a cell at $(x_i,y_j)$. A shortest path from a cell at $(x_i,y_j)$ to a source "s" can be obtained by following the direction of the gradient of the distance field of $T_s(x_i,y_j)$. Another path from a cell at $(x_i,y_j)$ to a target "t" can be obtained by following the gradient of the distance field of $T_t(x_i,y_j)$. A combination of these two paths is an optimal path (shortest path) from source "s" to target "t" by way of a cell at $(x_i,y_j)$. Moreover, $T_{total}(x_i,y_j)$ represents the quality of the path or the distance of the path that originates from a cell at $(x_i,y_j)$. The best or the shortest path connecting source "s" and target "t" is the path that originates from a cell $(x_i^*,y_j^*)$, where $T_{total}(x_i^*,y_j^*)$ is minimum. Moreover, the next best path corresponds to a path that originates from a cell, of which the two-way total time is smaller than any other cell except the minimum two-way total time. And, the $n^{th}$ best path corresponds to a path that originates from the cell with the $n^{th}$ smallest two-way total time.

Determination of "Distinct" Paths

Let N be the total number of cells in a three dimensional grid data volume excluding cells corresponding to a selected pair of source and target locations. Then, by using the method described above, one can generate N paths connecting source and target. Some of these paths are exactly the same, while others are similar to each other, and still others quite different. Therefore, for the purpose of determining distinct paths, there is a need for a method that eliminates similar paths. One simple approach that will reduce the number of similar paths is that of decimation: selecting paths that correspond to every $m^{th}$ cell in the x, y, and z directions, and discarding the paths associated with intervening cells. This approach is based on the notion that paths that originate from neighboring cells tend to be similar. However, this decimation method does not guarantee "distinct" paths. Moreover, for a large value of m, it may miss a "distinct" path.

Another simple approach that will reduce the number of similar paths is the method of selecting every $m^{th}$ path from the list of N paths that are sorted in the order of their two-way total distance. This method is based on the notion that similar paths have similar two-way total distance $T_{total}(x,y)$. Again, this method does not guarantee "distinct" paths. Moreover, for a large value of m, it may miss a "distinct" path.

A distinct path is defined herein as a locally optimal path. In turn, a locally optimal path is defined as a path that has minimal distance among all paths in its vicinity. Thus, if one makes a slight variation of a locally optimal path, such a path would have a larger distance. (This accords with the accepted meaning and usage of the term local optimum in applied mathematics and computer science.)

For a data volume of N cells that contains source and target objects, there are N shortest paths, each of which originates from a cell and is connected to both a source and a target. The metric for the distance of each path is its two-way total propagation time $T_{total}(x_i, y_i)$. Therefore, a locally optimal path is a path that originates from a cell that has a minimum two-way total time among all cells in its vicinity. This corresponds to the problem of finding cells that are local minima in their two-way total times. These cells may be called anchor cells. It can be observed that, by the nature of the problem, anchor cells form valleys in two-way total time field and have zero gradients. Locally optimal paths will pass through some parts of these valleys. A cell located at a valley of the two-way total time field can be detected by having a Gaussian curvature of zero and a positive mean curvature. Alternatively, it can be detected as a cell with one principal curvature of zero and the other principal curvature being positive. However, computation of second derivatives tends to be sensitive to noise, and surface classification (such as valleys or ridges) in a real world problem is complicated by not knowing where to set a small but non-zero threshold value that will define whether a curvature value is small enough to be considered to be zero.

By observing that an anchor cell must have a zero gradient and an anchor cell has other anchor cells forming a valley along its path, anchor cells and corresponding locally optimal paths are determined as follows in one exemplary embodiment, e.g., containing the following seven steps:

(1) First, a two-way total time is computed for all the cells of a three dimensional grid data volume. (2) Second, a list of all candidate cells is made, i.e. candidates for anchor cells, meaning any cell for which the absolute value of the gradient of the two-way total time field is less than a threshold value T, selected to be close to zero but still allowing for deviations from exact zero due to data noise or other real world imperfections. (3) Third, select a cell with a minimum two-way total time, from the candidate cell list, as a candidate anchor cell. (4) Fourth, determine an optimal path connecting the candidate anchor cell to two objects. (5) Fifth, if the segment of the path of length L on both sides of the candidate anchor cell has at least a user-selected number ($G_{zero}$) of cells having the magnitude of their gradient less than a user-selected threshold value such as T (typical values of $G_{zero}$ may include 3, 5 or 7—the purpose is to make sure that the zero gradient at the candidate anchor cell is not a spurious value), then:

a. Accept the candidate anchor cell as an anchor cell and accept the path as a "distinct" path.
  b. Identify cells that are within a user-selected S distance from the newly found "distinct" path and delete them from the candidate cell list. Selection of S may be governed by considerations of what degree of drainage path delineation and differentiation is meaningful for a reservoir development plan. Then, return to step (3).

Otherwise, in step (6), delete the current candidate anchor cell from candidate cell list and return to step (3). In step (7), repeat steps (3)-(6) until the candidate cell list is exhausted, i.e. all cells on the candidate list have been accepted or deleted.

The number of paths obtained by using the present technique will vary depending on the user-selected parameters T and S. Using too large a value for T may generate non-locally-optimal paths while too small a value for T may miss locally optimal paths. Also, selection of a too small a value of S may generate non-locally-optimal paths while too large a value for S may miss locally optimal paths. It may be advantageous to start with a relatively large value of T and a small value of S.

The resulting set of paths may include some non-locally-optimal or "non-distinct" paths but will not miss any locally optimal paths. Then, non-locally-optimal paths can be reduced by decreasing T and/or increasing S until only locally optimal paths remain.

In a practical application of the present inventive technique for an analysis of connected paths between two objects, such as connected paths between injection and production wells, the fact that this method can ensure no loss of a locally optimal path is very important. Also, the flexibility of the present inventive method to control the number of additional non-locally-optimal paths benefits analysis of connected paths between two objects.

U.S. patent application Ser. No. 61/008,048 describes a method that determines locally optimal paths among multiple objects (two or more), while the present inventive method is limited to determining locally optimal paths among two objects. However, as stated, the present inventive method can ensure no loss of a locally optimal path and has flexibility in controlling the number of non-locally-optimal paths, both advantages not readily available with U.S. patent application Ser. No. 61/008,048

For an analysis of locally optimal paths among three or more objects, one can use the method of U.S. patent application Ser. No. 61/008,048. However, persons skilled in the technology field may recognize that the present inventive method can be adapted to be combined with the method of U.S. patent application Ser. No. 61/008,048 so as to ensure no loss of a locally optimal path and the flexibility in controlling the number of non-locally-optimal paths even for more than two objects.

Figure 1B:
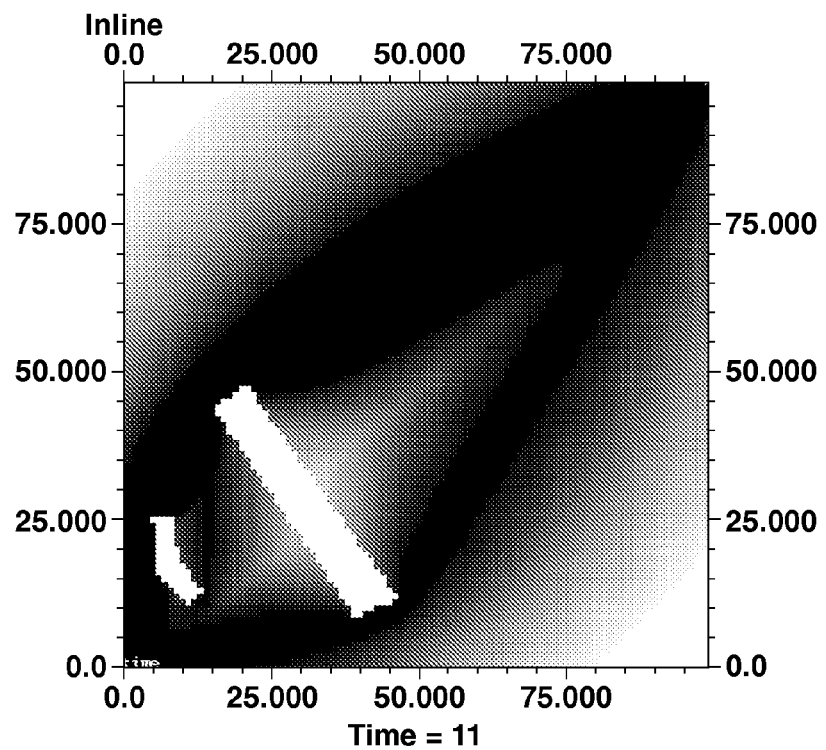
FIG. 1B shows computed two-way total time field for the example shown in FIG. 1A, where darker gray scale represents lower values of the time field.
Figure 1C:
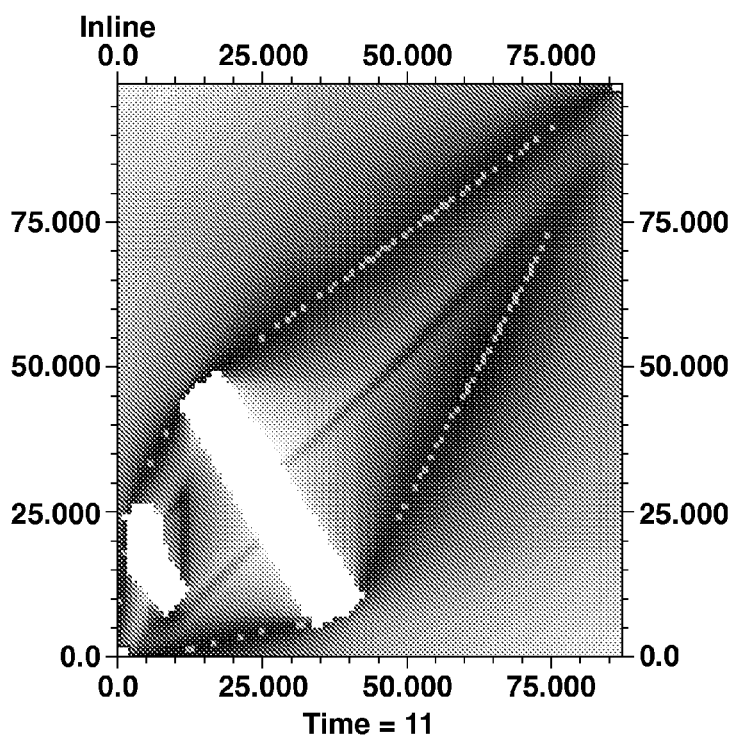
FIG. 1C shows absolute values of gradients of the two-way total time field of FIG. 1b, where darker gray scale corresponds to values closer to zero, and cells that satisfy gradient threshold values are shown in white.
Figure 1D:
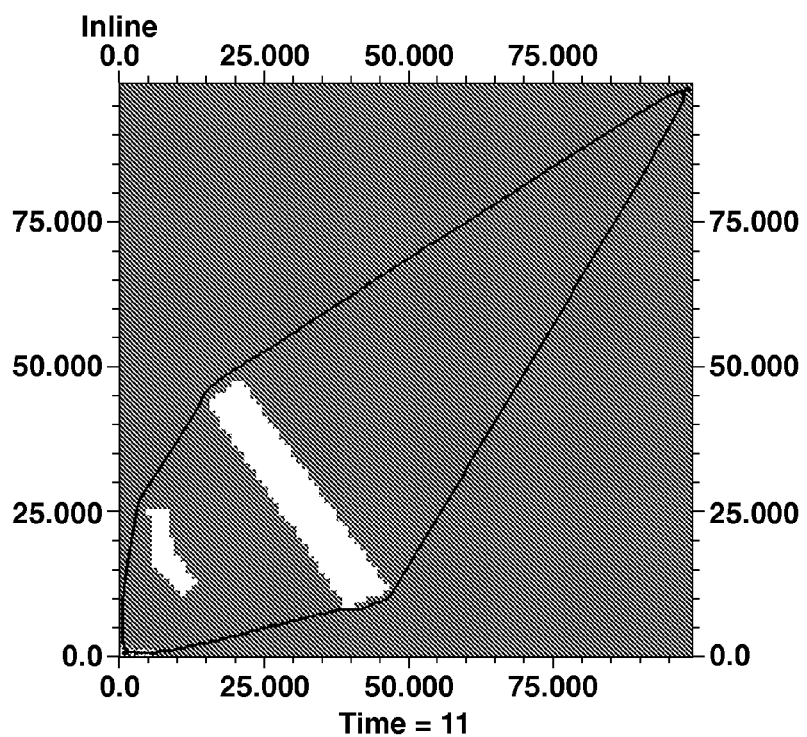
FIG. 1D shows two locally optimal paths connecting a pair of source and target for the example problem shown in FIG. 1A.

Locally optimal paths in a simple heterogeneous media with two barriers: FIG. 1A shows a first exemplary pair of source and target at bottom left and top right corners in a medium that is homogeneous except at the two barriers shown in white. The speed of propagation is taken to be 1 velocity unit except at the two barriers where it is zero. A fast marching method was used to compute arrival time at each cell from the source. The fast marching method was used again to compute arrival time at each cell from the target. Two-way total time at each cell is computed by adding these two arrival times at each cell. FIG. 1B shows two-way total time represented in gray scale: darker gray shades corresponding to lower values of two-way total time. Two valleys can be observed in the darker gray scale. As noted before, anchor cells that correspond to locally optimal paths are at the bottom of these valleys in a two-way total time field. FIG. 1C shows absolute values of gradients of two-way total time in gray scale: darker grays corresponding to values closer to zero. The cells that have their gradient value less than 2 percent of the maximum gradient value are shown in white color. Even though there are many cells that satisfy the gradient threshold criteria (the cells in white), the process in step (5)-b above deletes candidate anchor cells that happen to be close to a locally optimal path found by a previously accepted anchor cells. In this example, only two locally optimal paths exist, which are shown in FIG. 1D.

Figure 2A:
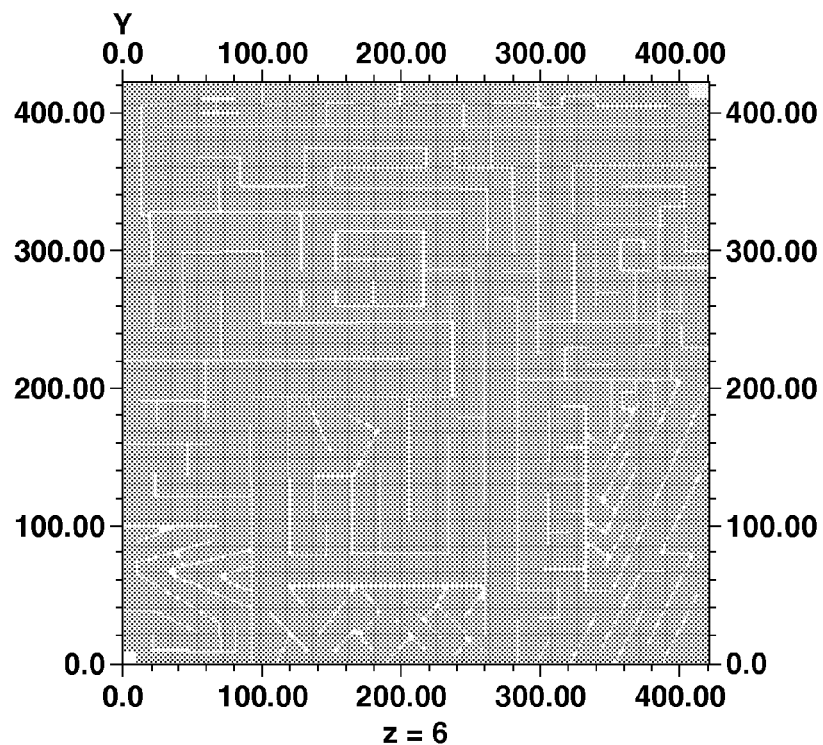
FIG. 2A shows an example two-dimensional heterogeneous medium that has some very simplified characteristics of a reservoir: corridors of a maze for flow regime and walls for no flow barriers, with a pair of source and target for injection and production well pairs.
Figure 2B:
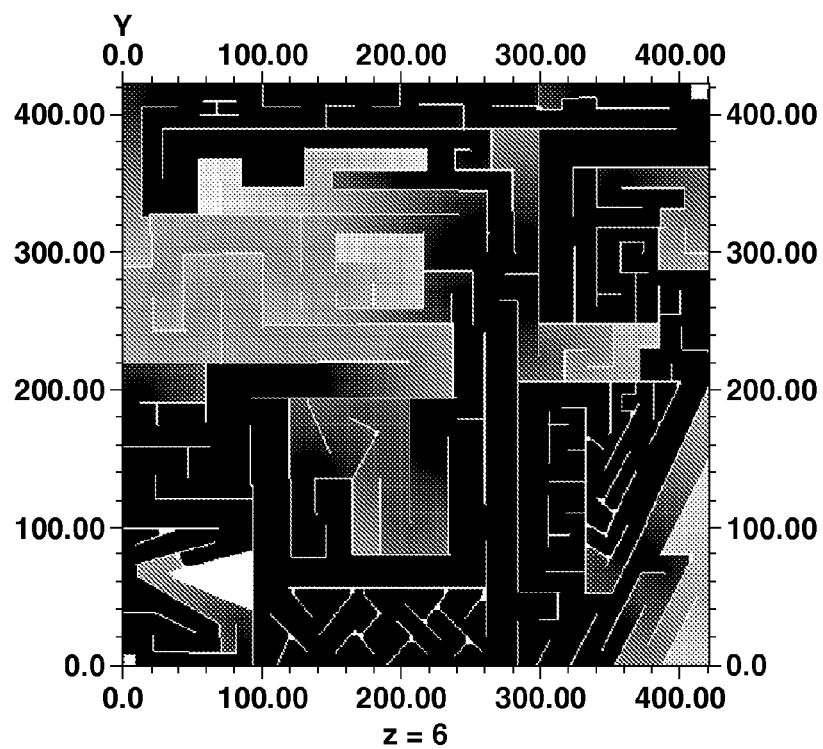
FIG. 2B shows computed two-way total time filed of the maze in FIG. 2A.
Figure 2C:
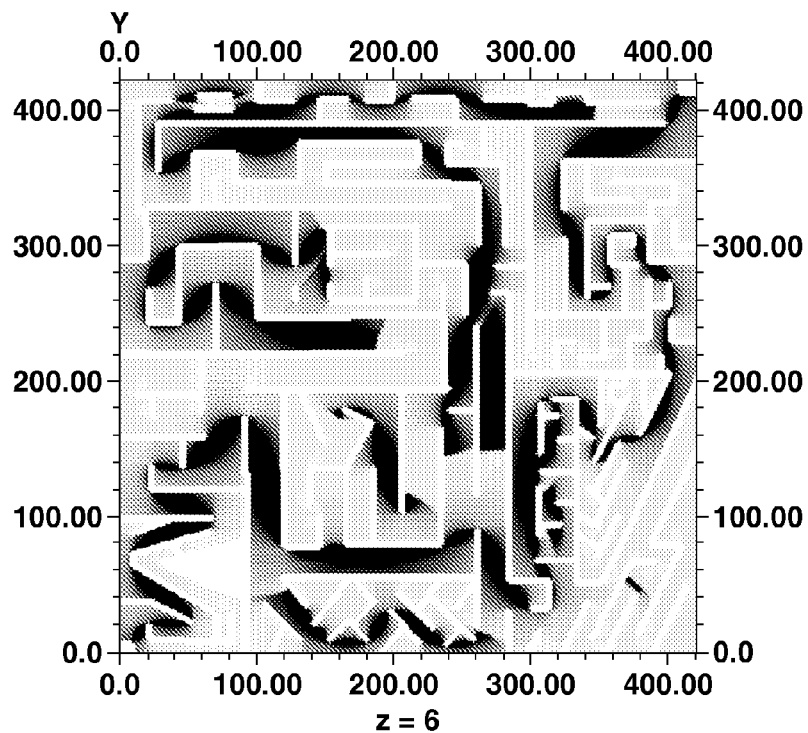
FIG. 2C shows absolute values of gradients of two-way total time field in FIG. 2B.
Figure 2D:
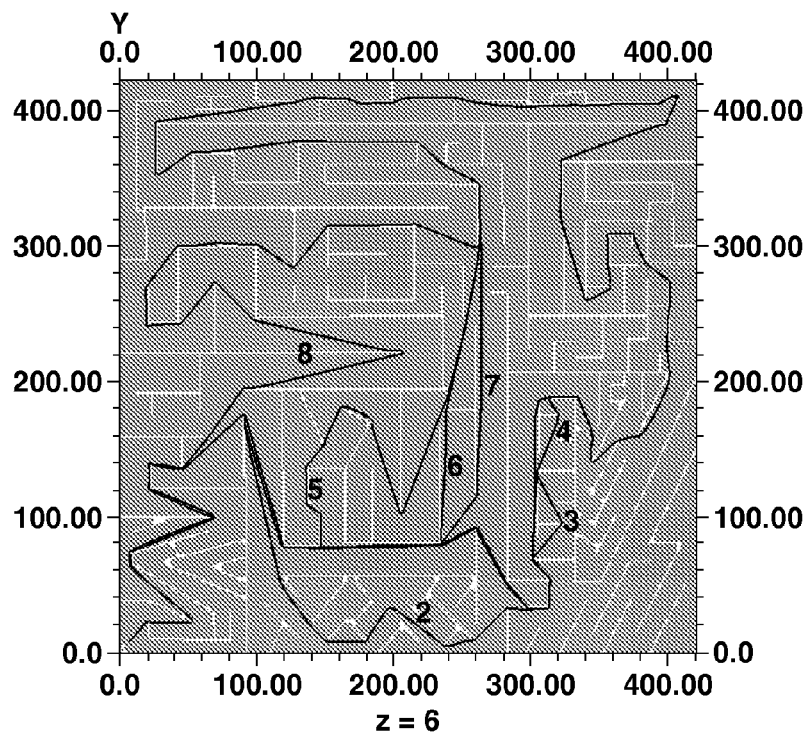
FIG. 2D shows eight locally optimal paths connecting a pair of source and target through the maze of FIG. 2A.
Figure 3A:
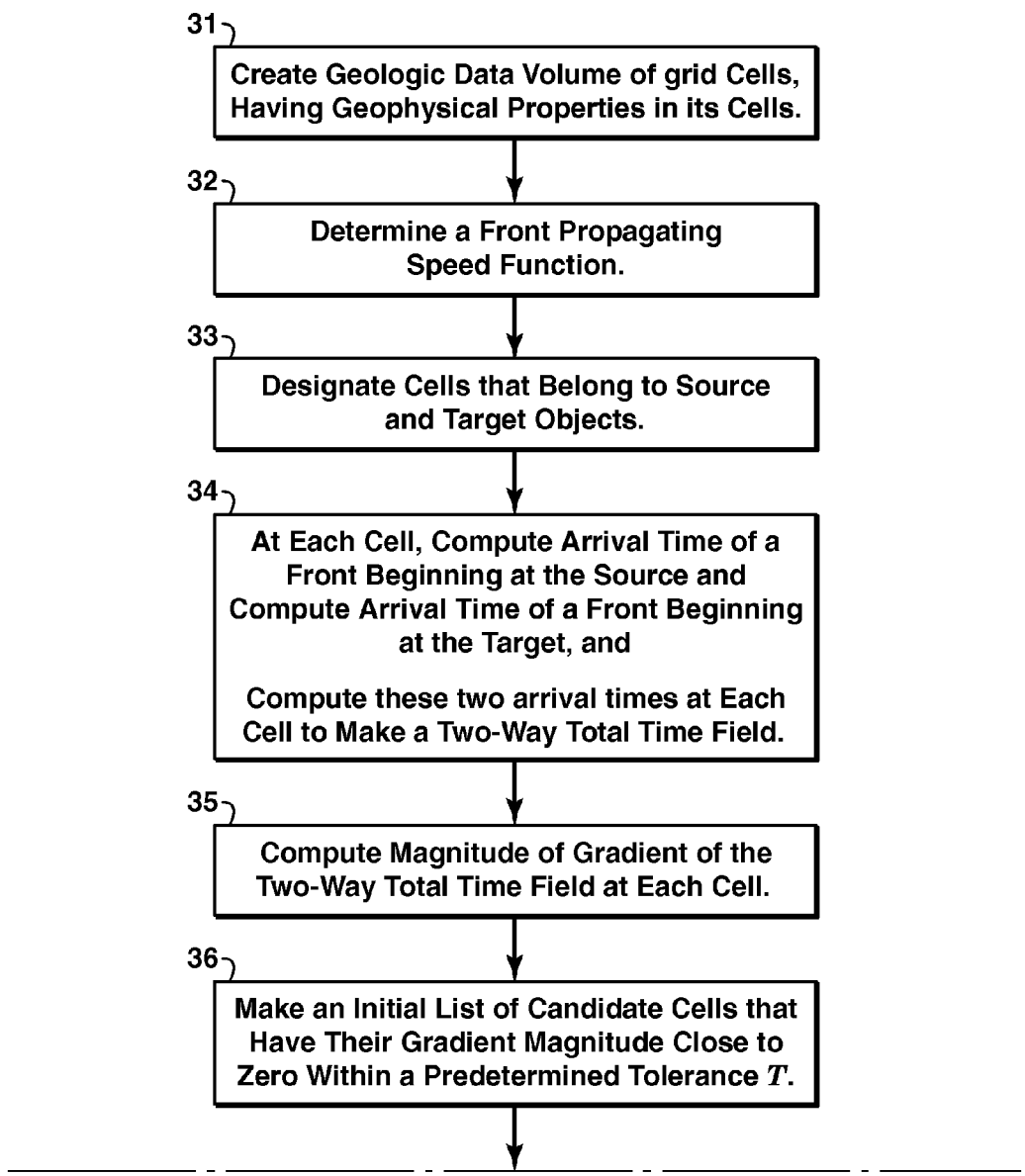
FIG. 3 is a flowchart showing basic steps in one embodiment of the present inventive method.
Figure 3B:
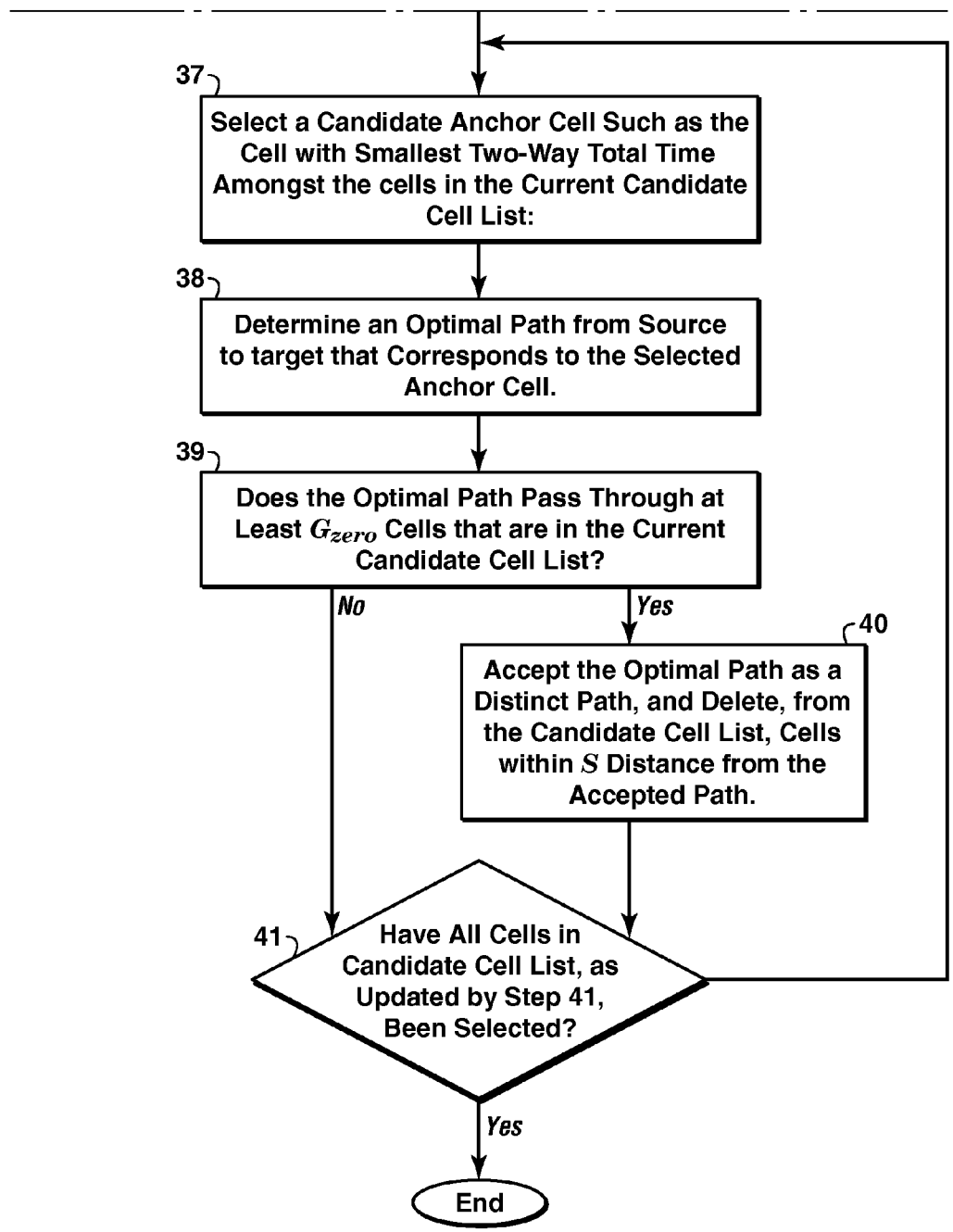

Locally optimal paths in a two dimensional maze: referring to FIGS. 2A-2D, another exemplary problem incorporates the objective of finding all locally optimum paths between two objects in a homogeneous medium maze, e.g., as illustrated in FIG. 2A, in which two objects are located at the bottom left and top right corners. This maze example has some very simplified characteristics of a reservoir: corridors of a maze for flow regime and walls for no flow barriers, with a pair of source and target for injection and production well pairs. Computed two-way total time is displayed in gray scale in FIG. 2B: smaller values shown in darker grays. Visualization of two-way total time itself is of value in recognizing where and how the two objects are connected each other. Absolute values of the gradients are shown in FIG. 2C, where darker shades correspond to lower values. With T=2 percent of maximum gradient value, $G_{zero}$=4, and S=5, the present inventive method found eight locally optimal paths connecting the two objects. FIG. 2D shows these eight paths in black lines, with reference numbers 1-8 corresponding to each of the locally optimal paths connecting the two objects, e.g., one or more of the paths may share common segments. The efficiency and the power of this method will be more pronounced for a more complicated problem such as a three dimensional maze problem with heterogeneous speed in its corridors.

For illustrative purposes, the invention has been described using examples of determining distinct alternative paths or locally optimal paths between two objects in a simple heterogeneous two-dimensional space. However, the complexity of the problem and the value of this invention increase rapidly as the degree of heterogeneity increases and for three dimensional grid data volumes.

The present inventive method is considered to be an alternative or competing method to the method of analyzing reservoir connectivity described in the previously mentioned patent application Ser. No. 61/008,048. At least some of the steps in the present invention would typically be performed on a computer, i.e., the invention is computer-implemented in preferred embodiments. Locally optimal paths as well as two-way total time field information may be outputted or stored in computer memory or other data storage devices as a final, real-world, concrete, tangible step.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for assessing reservoir connectivity in a subsurface region for the purpose of planning and managing production of hydrocarbons from the subsurface region, comprising:
    (a) creating a geologic cellular model in a computer of at least a portion of the subsurface region, said model containing a value of a selected geophysical property for each cell of the model;
    (b) determining a front propagation speed for each cell as a function of the selected geophysical property;
    (c) selecting a source object and a target object in the model, wherein source object is associated with one or more source cells and the target object is associated with one or more target cells;
    (d) for a plurality of cells in the model excluding source and target cells, calculating arrival time for a front beginning at the source object to reach one of the cells in the plurality of cells in a computer, then calculating the arrival time for a front beginning at the target object to reach the one of the cells in the plurality of cells in a computer, then adding the two calculated times together and creating a two-way total arrival time for the one of the cells in the plurality of cells, said arrival time being calculated using the determined front propagation speed;
    (e) determining one or more distinct paths connecting source and target objects by calculating and using gradients of the two-way total arrival times and/or curvatures of the two-way total arrival times at the plurality of cells, wherein determining one or more distinct paths by using gradients of two-way total arrival times at the plurality of model cells comprises:

(i) forming, using, and updating a current candidate cell list consisting of cells from the plurality of cells that have gradient magnitude value of zero to within a selected tolerance;

(ii) selecting a cell from the current candidate cell list and determining an optimal path from the selected cell to the source object and another optimal path from the selected cell to the target object, and combining the determined optimal paths to form an optimal path associated with the selected cell; and (iii) accepting the optimal path associated with the selected cell as a distinct path if it passes through or touches at least a pre-determined number of cells having zero gradient within a selected tolerance, such cells being located within a predetermined proximity to the selected cell;

(f) assessing reservoir connectivity between source and target objects using the one or more distinct paths; and (g) planning or managing production of hydrocarbons from the subsurface region using the reservoir connectivity assessment.

2. The method of claim 1, wherein the selected cell has a two-way total arrival time as low or lower than any other candidate cell.

3. The method of claim 1, further comprising:
  (iv) identifying candidate cells within a pre-selected distance S from a distinct path, and updating the list of candidate cells by discarding such cells from the list.

4. The method of claim 3, further comprising repeating steps (ii)-(iv) until all cells in the updated list of candidate cells have been selected.

5. The method of claim 1, wherein determining an optimal path from the selected cell to the source object and another optimal path from the selected cell to the target object comprises backtracking the gradients of two-way total arrival times at the plurality of model cells from the source and target objects respectively.

6. The method of claim 1, wherein the selected source and target objects represent a production well and an injection well.

7. The method of claim 1, wherein the selected tolerance for zero gradient is ±2% of a maximum gradient value.

8. The method of claim 1, wherein the selected geophysical property is porosity or permeability.

9. The method of claim 1, wherein the geologic cellular model is a two-dimensional model.

10. The method of claim 1, wherein the geologic cellular model is a three-dimensional model.

11. A method for producing hydrocarbons from a subsurface region comprising:

(a) obtaining a hydrocarbon development plan for the subsurface region, said plan having been formulated by steps comprising:

(i) creating a geologic cellular model of at least a portion of the subsurface region in a computer, said model containing a value of a selected geophysical property for each cell of the model;

(ii) determining a front propagation speed as a function of the selected geophysical property;

(iii) selecting a source object and a target object in the model, wherein source object is associated with one or more source cells and the target object is associated with one or more target cells;

(iv) for a plurality of cells in the model excluding source and target cells,
  calculating arrival time for a front beginning at the source object to reach one of the cells in the plurality of cells in a computer, then calculating the arrival time for a front beginning at the target object to reach the one of the cells in the plurality of cells in a computer, then adding the two calculated times together and creating a two-way total arrival time for the one of the cells in the plurality of cells, said arrival time being calculated using the determined front propagation speed;

(v) determining one or more distinct paths connecting source and target objects by calculating and using gradients the two-way total arrival times and/or curvatures of the two-way total arrival times at the plurality of cells, wherein determining one or more distinct paths by using gradients of two-way total arrival times at the plurality of model cells comprises:

(1) forming, using, and updating a current candidate cell list consisting of cells from the plurality of cells that have gradient magnitude value of zero to within a selected tolerance;

(2) selecting a cell from the current candidate cell list and determining an optimal path from the selected cell to the source object and another optimal path from the selected cell to the target object, and combining the determined optimal paths to form an optimal path associated with the selected cell; and (3) accepting the optimal path associated with the selected cell as a distinct path if it passes through or touches at least a pre-determined number of cells having zero gradient within a selected tolerance, such cells being located within a predetermined proximity to the selected cell;

(vi) assessing reservoir connectivity between source and target objects using the one or more distinct paths;

(vii) generating the hydrocarbon development plan for the subsurface region based at least partly on the reservoir connectivity assessment; and (b) using the hydrocarbon development plan to produce hydrocarbons from the subsurface region.

* * * * *